(12) United States Patent
Hall et al.

(10) Patent No.: US 10,946,831 B2
(45) Date of Patent: Mar. 16, 2021

(54) RETRACTOR PRETENSIONER ASSEMBLY

(71) Applicant: AUTOLIV ASP, INC., Ogden, UT (US)

(72) Inventors: Christopher D. Hall, Algonac, MI (US); Bin Wang, Lake Orion, MI (US); Kenneth H. Kohlndorfer, Roseville, MI (US); Jon E. Burrow, Ortonville, MI (US); Richard W. Koning, Yale, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 184 days.

(21) Appl. No.: 16/283,948

(22) Filed: Feb. 25, 2019

(65) Prior Publication Data
US 2020/0269806 A1 Aug. 27, 2020

(51) Int. Cl.
*B60R 22/46* (2006.01)

(52) U.S. Cl.
CPC ...... *B60R 22/4628* (2013.01); *B60R 22/4604* (2013.01)

(58) Field of Classification Search
CPC ............................ B60R 22/4628; B60R 22/46
See application file for complete search history.

(56) References Cited

U.S. PATENT DOCUMENTS

| | | |
|---|---|---|
| 4,444,010 A | 4/1984 | Bendier |
| 5,697,571 A | 12/1997 | Dybro et al. |
| 5,881,962 A | 3/1999 | Schmidt et al. |
| 6,363,722 B1 | 4/2002 | Takehara et al. |
| 6,419,176 B1 | 7/2002 | Mizuno |
| 7,862,081 B2 * | 1/2011 | Thomas .............. B60R 22/1952 280/733 |
| 7,887,095 B2 | 2/2011 | Bieg et al. |
| 7,988,084 B2 | 2/2011 | Lombarte et al. |
| 8,042,835 B2 | 10/2011 | Bieg et al. |
| 8,371,613 B2 | 2/2013 | Hodatsu et al. |

(Continued)

FOREIGN PATENT DOCUMENTS

| | | |
|---|---|---|
| DE | 20 2006 004 748 U1 | 4/2007 |
| DE | 10 2006 031 359 A1 | 10/2007 |

(Continued)

OTHER PUBLICATIONS

International Search Report and Written Opinion of PCT/US2018/022367 dated Jul. 2, 2018.

(Continued)

Primary Examiner — Nicole T Verley
(74) Attorney, Agent, or Firm — Dickinson Wright PLLC

(57) ABSTRACT

A seatbelt pretensioning retractor assembly for use in a vehicle is provided. The seatbelt pretensioning retractor assembly includes a housing adapted for being mounted to a frame and having an interior cavity, a pretensioner tube having an arcuate and curved shape, a sprocket rotatably mounted to the housing and fixedly coupled to a spindle, a rod disposed within the tube and a guide plate having a guide portion and a rod guide. The rod exits the tube along a perimeter of the sprocket, and toward an arcuate landing surface of the guide portion. In addition, the guide plate further includes a couple of tabs and ribs for avoiding rattling of the pretensioner tube in normal use of the retractor assembly.

15 Claims, 9 Drawing Sheets

(56) References Cited

U.S. PATENT DOCUMENTS

| | | |
|---|---|---|
| 8,393,644 B2 | 3/2013 | Lee |
| 8,608,101 B2 * | 12/2013 | Choi ................... B60R 22/38 242/382 |
| 8,641,097 B2 * | 2/2014 | Hodatsu ............. B60R 22/4628 280/806 |
| 8,887,095 B2 | 11/2014 | Krishnamurthy et al. |
| 8,960,724 B2 | 2/2015 | Burrow et al. |
| 9,114,780 B2 | 8/2015 | Fischer et al. |
| 9,475,455 B2 | 10/2016 | Gray et al. |
| 9,555,768 B2 | 1/2017 | Gray et al. |
| 9,744,940 B1 | 8/2017 | Kohlndorfer et al. |
| 10,369,963 B2 * | 8/2019 | Kohlndorfer ....... B60R 22/4628 |
| 10,549,715 B2 * | 2/2020 | Yoshioka ............ B60R 22/4633 |
| 2001/0035472 A1 | 11/2001 | Hamaue et al. |
| 2004/0259672 A1 | 12/2004 | Betz |
| 2006/0157607 A1 | 7/2006 | Kohlndorfer et al. |
| 2006/0243843 A1 | 11/2006 | Clute |
| 2007/0241550 A1 | 10/2007 | Biet et al. |
| 2010/0051733 A1 | 3/2010 | Yamada |
| 2010/0090449 A1 | 4/2010 | Thomas |
| 2011/0011969 A1 | 1/2011 | Ogawa |
| 2011/0316265 A1 | 12/2011 | Lane, Jr. |
| 2012/0006925 A1 | 1/2012 | Burrow et al. |
| 2012/0146319 A1 | 6/2012 | Hodatsu et al. |
| 2012/0160947 A1 | 6/2012 | Nagata et al. |
| 2012/0212030 A1 | 8/2012 | Hodatsu et al. |
| 2013/0062450 A1 | 3/2013 | Fischer |
| 2013/0327872 A1 | 12/2013 | Gentner et al. |
| 2013/0327873 A1 | 12/2013 | Gentner et al. |
| 2014/0014758 A1 | 1/2014 | Gentner et al. |
| 2014/0084099 A1 | 3/2014 | Miyoshi et al. |
| 2014/0175210 A1 | 6/2014 | Betz et al. |
| 2014/0265289 A1 | 9/2014 | Burrow et al. |
| 2014/0265517 A1 | 9/2014 | Betz et al. |
| 2015/0336538 A1 | 11/2015 | Gray et al. |
| 2015/0336539 A1 | 11/2015 | Gray et al. |
| 2016/0114762 A1 | 4/2016 | Landbeck et al. |
| 2017/0001596 A1 | 1/2017 | Modinger et al. |
| 2017/0182974 A1 | 6/2017 | Moedinger et al. |
| 2017/0225651 A1 | 8/2017 | Asako |

FOREIGN PATENT DOCUMENTS

| | | |
|---|---|---|
| DE | 10 2006 031 360 A1 | 10/2007 |
| DE | 10 2006 031 369 A1 | 10/2007 |
| DE | 10 2010 051 463 A1 | 5/2012 |
| DE | 10 2010 054 846 A1 | 6/2012 |
| DE | 10 2011 016 153 A1 | 10/2012 |
| DE | 10 2010 054 845 A1 | 3/2013 |
| DE | 10 2012 019 004 A1 | 3/2014 |
| WO | WO 2012/065654 A1 | 5/2012 |
| WO | WO 2012/065655 A1 | 5/2012 |
| WO | WO 2012/065656 A1 | 5/2012 |
| WO | WO 2012/065672 A1 | 5/2012 |
| WO | WO 2013 156122 A1 | 10/2013 |
| WO | WO 2014/194993 A1 | 12/2014 |
| WO | WO 2015/169427 A2 | 11/2015 |

OTHER PUBLICATIONS

International Search Report and Written Opinion of PCT/US2018/022323, dated Jun. 6, 2018.

International Search Report and Written Opinion of PCT/US2018/022429 dated Jun. 7, 2018.

Jon Burrow et al., U.S. Appl. No. 12/830,792, Entitled "High Seal Retractor Pretensioner Piston," filed Jul. 6, 2010, 25 pgs.

Gunter Clute, U.S. Appl. No. 11/115,583, Entitled "Pretensioner Device for a Seatbelt Retractor," filed Apr. 27, 2005, 20 pgs.

Non-Final Office Action from U.S. Appl. No. 14/286,087, dated Nov. 18, 2015.

Non-Final Office Action from U.S. Appl. No. 14/286,184, dated Nov. 16, 2015.

* cited by examiner

RETRACTOR PRETENSIONER ASSEMBLY

FIELD

The present disclosure relates to seatbelt restraint devices for restraining an occupant of a vehicle, and more particularly relates to devices for pretensioning a seatbelt.

BACKGROUND

The statements in this section merely provide background information related to the present disclosure and may not constitute prior art.

Seatbelt restraint systems for restraining an occupant in a vehicle seat play an important role in reducing occupant injury in vehicle crash situations. Seatbelt restraint systems of the conventional so-called "3-point" variety commonly have a lap belt section extending across the seat occupant's pelvis and a shoulder belt section crossing the upper torso, which are fastened together or are formed by a continuous length of seatbelt webbing. The lap and shoulder belt sections are connected to the vehicle structure by anchorages.

A belt retractor is typically provided to store belt webbing and may further act to manage belt tension loads in a crash situation. Seatbelt restraint systems which are manually deployed by the occupant (so-called "active" types) also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision.

OEM vehicle manufacturers often provide seatbelt restraint systems with pretensioning devices, which tension the seatbelt either during an impact of the vehicle or even prior to impact (also known as a "pre-pretensioner") to enhance occupant restraint performance. The pretensioner takes out slack in the webbing and permits the belt restraint system to couple with the occupant early in the crash sequence. One type of pretensioner acts on the webbing retractor to tension the belt.

Various designs of retractor pretensioners presently exist, including a type known as a roto-pretensioner that incorporates a gas generator for generating a pyrotechnic charge. Examples of such roto-pretensioners are described in U.S. Pat. No. 5,881,962, filed Apr. 11, 1995, U.S. Patent Application Publication No. 2006/0243843, filed Apr. 27, 2005, U.S. Patent Application Publication No. 2012/0006925, filed Jul. 6, 2010, and U.S. Pat. No. 7,988,084, filed Aug. 2, 2011, which are commonly owned by the assignee of the present application and are hereby incorporated by reference in their entirety for all purposes. Generally, ignition of the pyrotechnic charge or other combustible material creates gas pressure in a chamber having a piston to impart motion upon a driving element such as a piston, rack and pinion, or series of balls disposed in a pretensioner tube, which engage with and wind a retractor spool sprocket to retract the webbing.

One issue with pretensioners using a series of metallic balls is the weight of the series of balls required for a full pretensioning stroke, as well as the corresponding cost of supplying multiple metallic balls with strict tolerances. Further, for pretensioners using a series of metallic balls, or rack and pinion based systems, is the need for a synchronizing or clutch feature to ensure that the series of balls or pinion sufficiently engage the retractor spool sprocket.

Another issue with pretensioners is known as a low resistance condition, where the driving elements will reach an end of stroke without experience substantial resistance. This can occur if there is excessive slack in the seatbelt webbing. In these cases, the low resistance results in a lower amount of backpressure from the driving elements. The backpressure is produced by the engagement between the driving elements and the sprocket, so lower backpressure reduces the pressure on a sealing element that trails the driving elements. Reduced pressure on the sealing elements reduces the amount that the sealing element is compressed circumferentially. Reduced sealing ability can cause gas to leak from the tube around the series of balls.

A further issue with pretensioners is the need to maintain the retractor and the seatbelt webbing in a locked condition at the end of the pretensioning stroke. When the retractor spool does not remain locked, payback can occur which allows the seatbelt to unspool and reintroduce slack in the seatbelt. One method for maintaining the locked position includes maintaining pressure from the gas generator beyond the amount needed for the pretensioning stroke. However, this adds weight and cost.

SUMMARY

The present disclosure relates to a seatbelt pretensioning retractor assembly including a spindle and a frame for use in a vehicle.

According to one aspect of the present disclosure, the seatbelt pretensioning retractor assembly includes a housing adapted for being mounted to the frame and having an interior cavity, a pretensioner tube having an arcuate and curved shape having a first tube end in fluid communication with a gas generator and an exit in fluid communication with the interior cavity for the housing, a sprocket rotatably mounted to the housing and fixedly coupled to the spindle adapted for taking up seatbelt webbing during pretensioning, a rod disposed within the tube and having a proximal end disposed away from the gas generator, and a guide plate placed in the housing. The guide plate has at least one of tabs for resiliently contacting to the pretensioner tube when the pretensioner tube is installed in the housing mounted to the frame.

According to a further aspect of the present disclosure, the at least one of the tabs is formed on a sitting surface of the guide plate and configured to avoid rattling of the pretensioner tube in normal use of the retractor assembly. A tab end of the at least one of the tabs is curved so that the curved tab end is resiliently contacted to the pretensioner tube.

According to a further aspect of the present disclosure, a first tab is positioned in a first area close to the first tube end of the pretensioner tube and a second tab is positioned in a second area close to the exit of the pretensioner tube. the tabs are formed as a cantilever type. The tabs are press-fitted to the pretensioner tube and avoid x-directional movement of the tube when the pretensioner tube is installed in the housing.

According to a further aspect of the present disclosure, the guide plate further includes at least one of ribs for avoiding rattling of the pretensioner tube when the pretensioner tube is installed in the housing. A first rib is protruded from a tube-contacting surface of a guide portion in a first area, and a second rib is protruded from a guiding surface of a rod guide in a second area.

According to a further aspect of the present disclosure, a narrowed space is defined in each of the first area and the second area due to the protruded ribs for an interference-fit between the protruded ribs and the pretensioner tube. The first ribs is configured to avoid y-directional movement of the pretensioner tube and the second rib is configured to avoid y- and z-directional movement of the pretensioner tube.

According to a further aspect of the present disclosure, the rod exits the tube along a perimeter of the sprocket, and toward an arcuate landing surface of the guide portion in response to an actuation by the gas generator to rotate the sprocket and spindle to take up seatbelt webbing. The sprocket includes a plurality of vanes that plastically deform the rod in response to the rod engaging the sprocket. The sprocket rotates in response to the rod contacting the sprocket.

According to a further aspect of the present disclosure, the seatbelt pretensioning retractor assembly includes a seal member disposed within the tube between the gas generator and the rod.

According to a further aspect of the present disclosure, the assembly has a first state prior to actuation of the gas generator, where the distal end of the rod is disposed proximally from the exit of the tube, a second state, where the distal end of the rod engages the sprocket, and a third state, where the distal end of the rod is disengaged from the sprocket.

Further details and benefits will become apparent from the following detailed description of the appended drawings. The drawings are provided herewith purely for illustrative purposes and are not intended to limit the scope of the present disclosure.

DRAWINGS

The drawings described herein are for illustration purposes only and are not intended to limit the scope of the present disclosure in any way.

It should be understood that throughout the drawings, corresponding reference numerals indicate like or corresponding parts and features.

DETAILED DESCRIPTION

Figure 1:
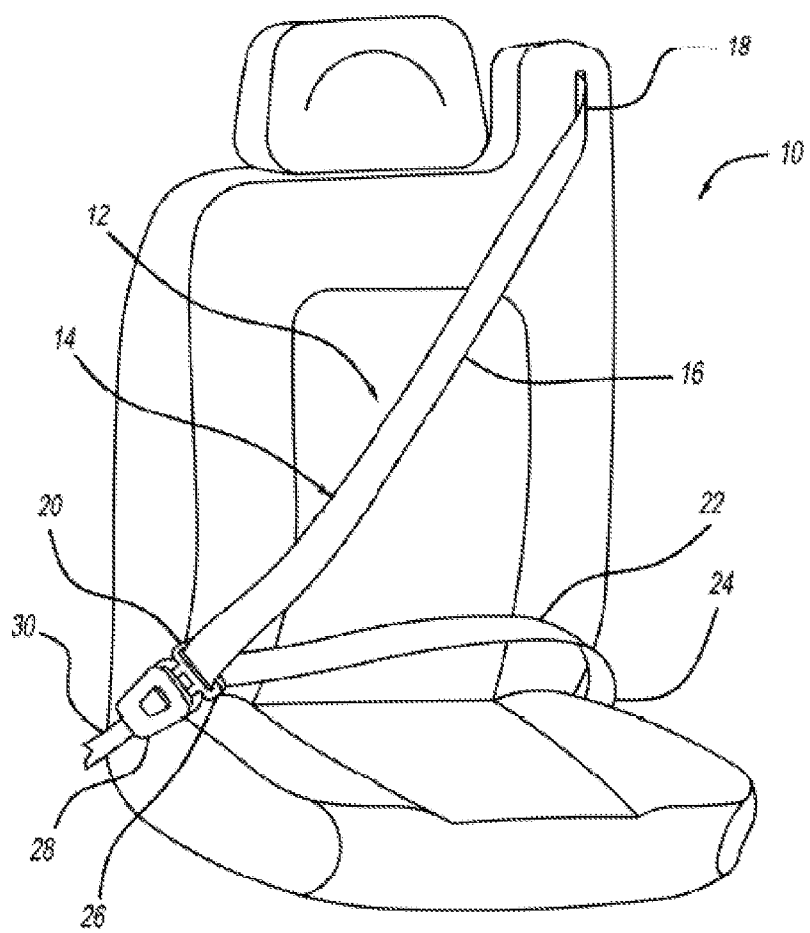
FIG. 1 shows a perspective view of an occupant restraint system.

The following description is merely exemplary in nature and is in no way intended to limit the present disclosure or its application or uses. It should be understood that throughout the drawings, corresponding reference numerals indicate like or corresponding parts and features.

FIG. 1 illustrates a vehicle seat 10 and a seatbelt assembly 12 for a vehicle according to an exemplary form of the present disclosure. The seatbelt assembly 12 includes a seatbelt webbing 14 having a shoulder belt portion 16 extending from an upper guide loop or anchorage 18 to a latch plate 20 and a lap belt portion 22 extending from the latch plate 20 to a lower anchorage 24. The latch plate 20 can include a loop portion 26 through which the webbing 14 extends. The latch plate 20 can be inserted into a seatbelt buckle 28 to lock and unlock the seatbelt assembly 12. A seatbelt buckle cable 30, either directly or in cooperation with other components, secures the seatbelt buckle 28 to a portion of the vehicle frame. It will be appreciated that other manners of attaching the seatbelt webbing 14 to vehicle could also be used, including variations on the latch plate 20 and the seatbelt buckle 28 and their attachments to the webbing 14 and associated vehicle structure.

The seatbelt webbing 14 is able to pay-out from a retractor assembly 32 (shown in FIGS. 2 and 3), which is located within the vehicle seat 10 (in an integrated structural seat design) or is coupled structurally to the vehicle body, so that the effective length of the seatbelt webbing 14 is adjustable. When the buckle latch plate 20 has been fastened to the seatbelt buckle 28, the seatbelt assembly 12 defines a three-point restraint between the upper anchorage 18, the buckle latch plate 20, and the lower anchorage 24. Any other suitable configurations, such as alternative locations for the retractor assembly 32, the buckle latch plate 20, and the lower anchorage 24, may be used with the present disclosure.

Figure 2:
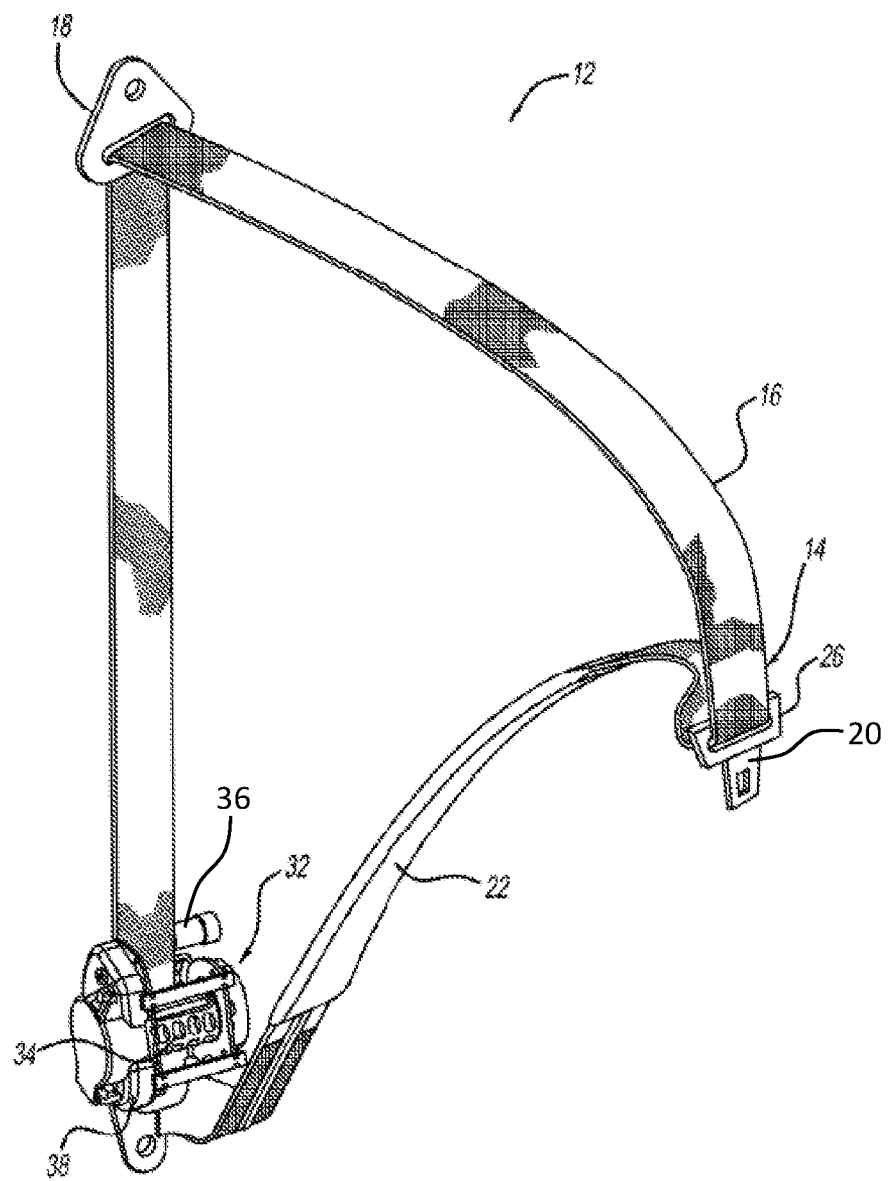
FIG. 2 is a perspective view of the occupant restraint system with various components removed to show a seatbelt retractor assembly including a pretensioner system of FIG. 1.

Referring to FIG. 2, an isometric view of the seatbelt assembly 12 of the present disclosure is illustrated disassociated from the vehicle and showing the retractor assembly 32. The retractor assembly 32 includes a spool assembly 34 and a gas generator 36 mounted to a common frame 38. The spool assembly 34 is connected with and stows the webbing 14 of the shoulder belt portion 16, whereas the end of the lap belt portion 22 of the webbing 14 is fixedly engaged with the anchorage point, for example, the frame 38 or another portion of the vehicle such as the seat 10 or floorpan.

Figure 3:
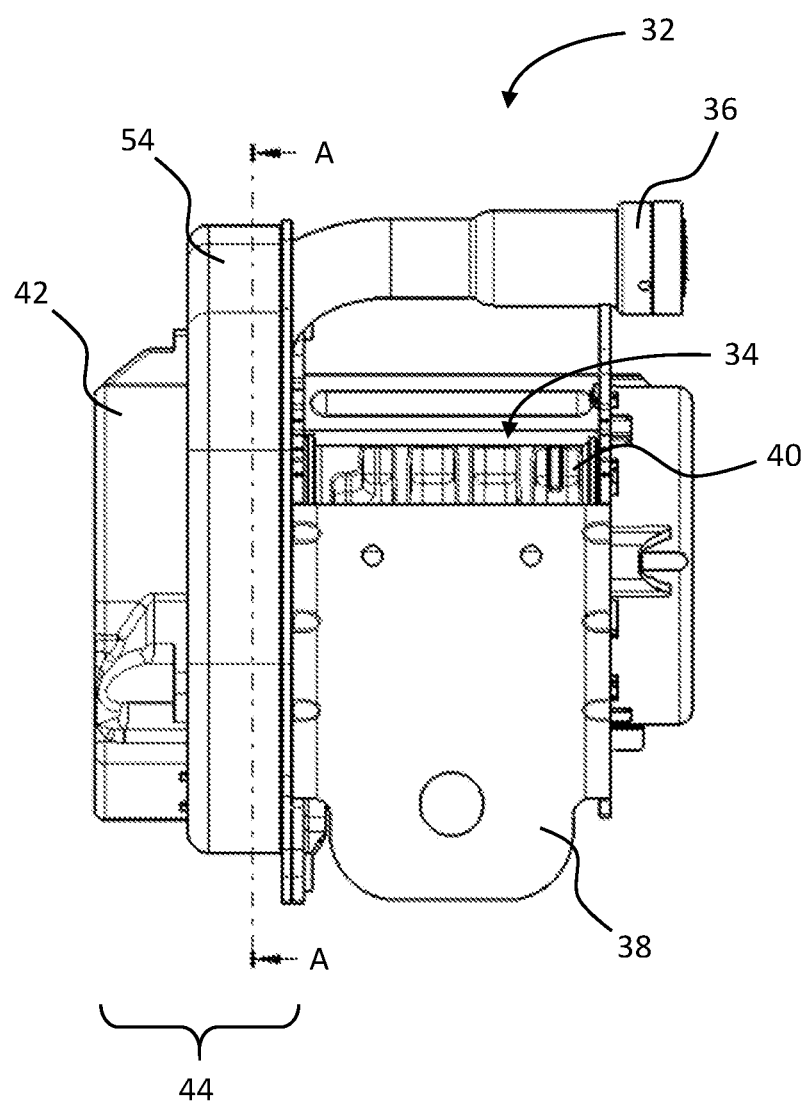
FIG. 3 is a plane view of the seatbelt retractor assembly including the pretensioner system in accordance with an exemplary form of the present disclosure.

Referring to FIG. 3, the spool assembly 34 includes a spindle 40 that engages the shoulder belt portion 16 of the seatbelt webbing 14 and rotates to wind-up or pay-out the seatbelt webbing 14. A torsional "clock" or "motor" type spring is carried within a spring end cap 42 and rotationally biases the spindle 40 to retract the seatbelt webbing 14. The spool assembly 34 may further incorporate other spool control mechanisms that are known in accordance with the prior art, including pretensioners, inertia and webbing sensitive locking devices, torsion bar load limiters, or other belt control devices. "Spool control systems" referred to in this specification may include any system that controls the rotational movement of a webbing spool, thus controlling the extraction and retraction of seatbelt webbing. One such spool control system is a motor-assisted retractor. Spool locking devices typically incorporate an inertia sensitive element, such as a rolling ball or pendulum, and cause a sprocket of the spool control system to be engaged to prevent further withdrawing of the seatbelt webbing 14 from the spindle 40. Webbing sensitive locking devices sense rapid pay-out of seatbelt webbing 14 to lock the retractor assembly 32. Various electronic sensing mechanisms that detect the withdrawal of seatbelt webbing 14 and/or the connection of the latch plate 20 to the seatbelt buckle 28 may also be incorporated into the retractor assembly 32.

During normal operation of the vehicle, the retractor assembly 32 allows pay-out of seatbelt webbing 14 to give the occupant a certain amount of freedom of movement. However, if an impact or a potential impact situation is detected, the retractor assembly 32 is locked to prevent pay-out and to secure the occupant in the seat 10. For example, if the vehicle decelerates at a predetermined rate, then the retractor assembly 32 is locked. Due in part to the free pay-out of the seatbelt webbing 14, the seatbelt assembly 12 often develops slack during normal use.

Figure 4:
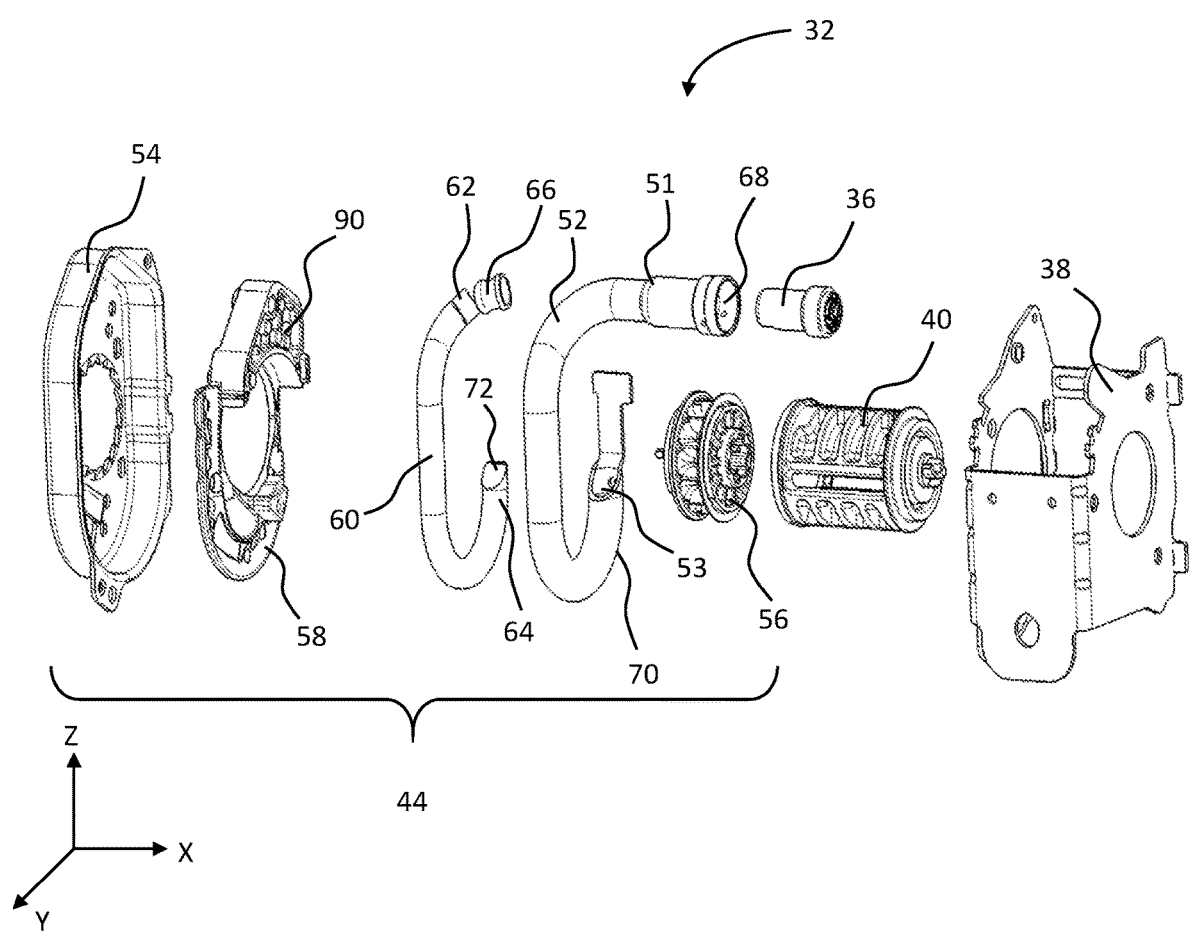
FIG. 4 is an exploded view of the seatbelt retractor assembly including the pretensioner system shown in FIG. 3.

FIG. 4 shows an exploded view of the retractor assembly 32 including a pretensioner system 44 in accordance with an exemplary form of the present disclosure. Referring to FIGS. 3-4, the retractor assembly 32 further incorporates the pretensioner system 44 operatively connected to the spool assembly 34 and operable to rotate the spindle 40 for pretensioning. As known to those of skill in the art, a retractor pretensioner winds seatbelt webbing into a more tight condition against the occupant at the initial stages of a detected vehicle impact. This is provided to reduce forward motion or excursion of the occupant in response to the deceleration forces of a vehicle impact or rollover.

As shown in FIGS. 3 and 4, the pretensioner system 44 includes a pretensioner tube 52 in communication with the gas generator 36 at a first tube end 51 of the pretensioner tube 52. The gas generator 36 is used to provide expanding gas in response to a firing signal. As known in the art, for example, the vehicle includes a sensor array sending a signal indicative of an emergency event such as an impact event, crash, or rollover. The vehicle sensor may be a specific impact sensor, or may be a traditional vehicle sensor (e.g., longitudinal or lateral acceleration sensor or otherwise part of a control system having a suite of multiple sensors. Any other impact sensor that is or will be known to those skilled in the art may also be readily employed in conjunction with the seatbelt assembly 12 of the present disclosure. An electronic control unit such as a central processing unit (CPU) or other controller receives a signal and controls the seatbelt assembly 12 to respond by tightening the seatbelt webbing 14 of the vehicle (e.g., via activation of a pretensioner).

In FIG. 4, the pretensioner tube 52 has a polymer rod 60, e.g., a polymer rod or a plastically deformable polymer rod disposed therein that has an elongate shape and is flexible within the tube 52. More specifically and as will be discussed in further detail below, the polymer rod 60, when disposed outside of the pretensioner tube 52 prior to insertion therein, has a generally straight shape, and when inserted into the tube 52 it will bend and flex in accordance with the tortuous shape of the tube 52 as shown in the exploded view of FIG. 4.

As shown in FIGS. 3 and 4, the retractor assembly 32 includes the spool assembly 34 mounted to the common frame 38. More particularly, the spool assembly 34 will rotate relative to the common frame 38 to wind the seatbelt webbing 14 attached to the spool assembly 34. The common frame 38 includes a housing 54 for placing the components of the pretensioner system 44 inside the housing 54.

In FIG. 4, the spool assembly 34 includes a sprocket 56 that is disposed within the housing 54. The sprocket 56 is attached to the spindle 40. Rotation of the sprocket 56 will cause the attached spindle 40 to rotate to wind the seatbelt webbing 14 that is attached to the spindle 40.

As shown in FIG. 4, the rod 60 has a generally circular cross-section in an exemplary form of the present disclosure. According to other forms of the present disclosure, the rod 60 could have a non-circular cross-section, such as a rectangular cross-section, triangular cross-section, or other polygonal cross-section that allows the rod 60 to be inserted into the tube 52 and adapt to the tortuous shape of the tube 52 when inserted. The polygonal cross-section may rotate along the length of the rod 60 to create a spiral shape. In addition, the rod 60 may include protrusions, such as longitudinal rails or circumferential rings, or recesses, such as longitudinal or circumferential grooves.

As shown in FIG. 4, the rod 60 includes a proximal end 62 that is disposed toward gas generator 36 when the rod 60 is installed within the pretensioner system 44. The rod 60 further includes a distal end 64 that is disposed at the opposite end of the rod 60 from the proximal end 62. The distal end 64 has a tapered shape with a tip angle 72, but other suitable shape of the distal end 64 may be implemented according to other forms of the present disclosure.

The rod 60 is preferably made from a polymer material, which has a reduced weight relative to metallic ball driving elements of the other roto-pretensioners. The particular polymer material can be selected to fit the particular desires of the user. The polymer material is preferably one that has sufficient flexibility such that it can bend and flex through the tube 52 to allow for initial installation as well as in response to actuation by the gas generator 36. The polymer material is preferably one that sufficient stiffness to allow it to be pushed through the tube 52 in response to actuation, such that the rod 60 will sufficiently transfer a load to the sprocket 56 of the pretensioner system 44.

Further, the rod 60 is preferably made from a polymer material that is plastically deformable. During and after actuation, the rod 60 will be plastically deformed in response to actuation and contact with other components of the pretensioner system 44. This plastic deformation will be further discussed below with reference to the use of the system 44, where the plastic deformation will cause the system become locked to prevent or limit payback of the rod 60 without being completely dependent on maintained pressure in the system. The plastic deformation also allows the rod 60 to deform and engage with the vanes of sprocket 56.

In one approach, the rod 60 is made from a nylon thermoplastic material. The rod 60 could also be made from an aliphatic polyamide thermoplastic material. In another approach, the rod 60 could be made from a similar thermoplastic material, such as an acetal material or polyprophylene material. It will be appreciated, however, that other materials for the rod 60 could also be used that can activate the pretensioner system 44 without plastic deformation. For example, elastically deformable material could be used, but such a material would not provide each of the advantage of a plastically deformable rod.

Figure 5:
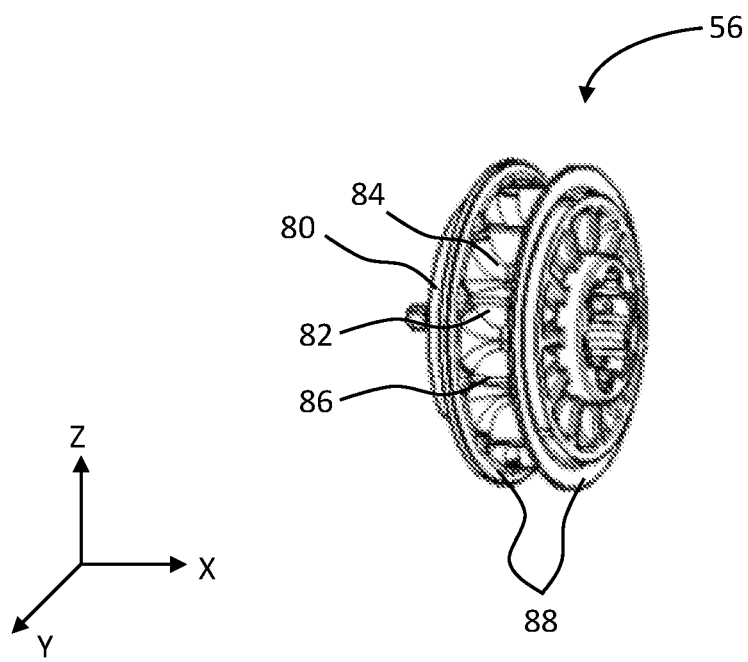
FIG. 5 is a perspective view of a sprocket with a plurality of vanes with the cavities according to the present disclosure.

Referring to FIGS. 4 and 5, the sprocket 56 has a general annular shape and includes an annular body portion 80. The sprocket 56 is configured to rotationally couple with the spindle 40 for operatively connecting the sprocket 56 to the spindle 40 at one side, and configured to operatively engage with the spring end cap 42 at an other side. As shown in FIGS. 4 and 5, the sprocket 56 includes a plurality of vanes 82 that each project radially from the body portion 80, such that the vanes 82 extend from the center of the body portion 80. In addition, as shown in FIG. 5, the sprocket 56 further includes flanges 88 for guiding the rod 60 when the rod 60 is engaged with the plurality of vanes 82 of the sprocket 56. Since the flanges 88 of the sprocket 56 radially extends further from the body portion 80 than a teeth point 86 of the vane 82, the flanges 88 may prevent the engaged rod 60 on the vane 82 of the sprocket from disengaging laterally (x-direction).

Figure 7:
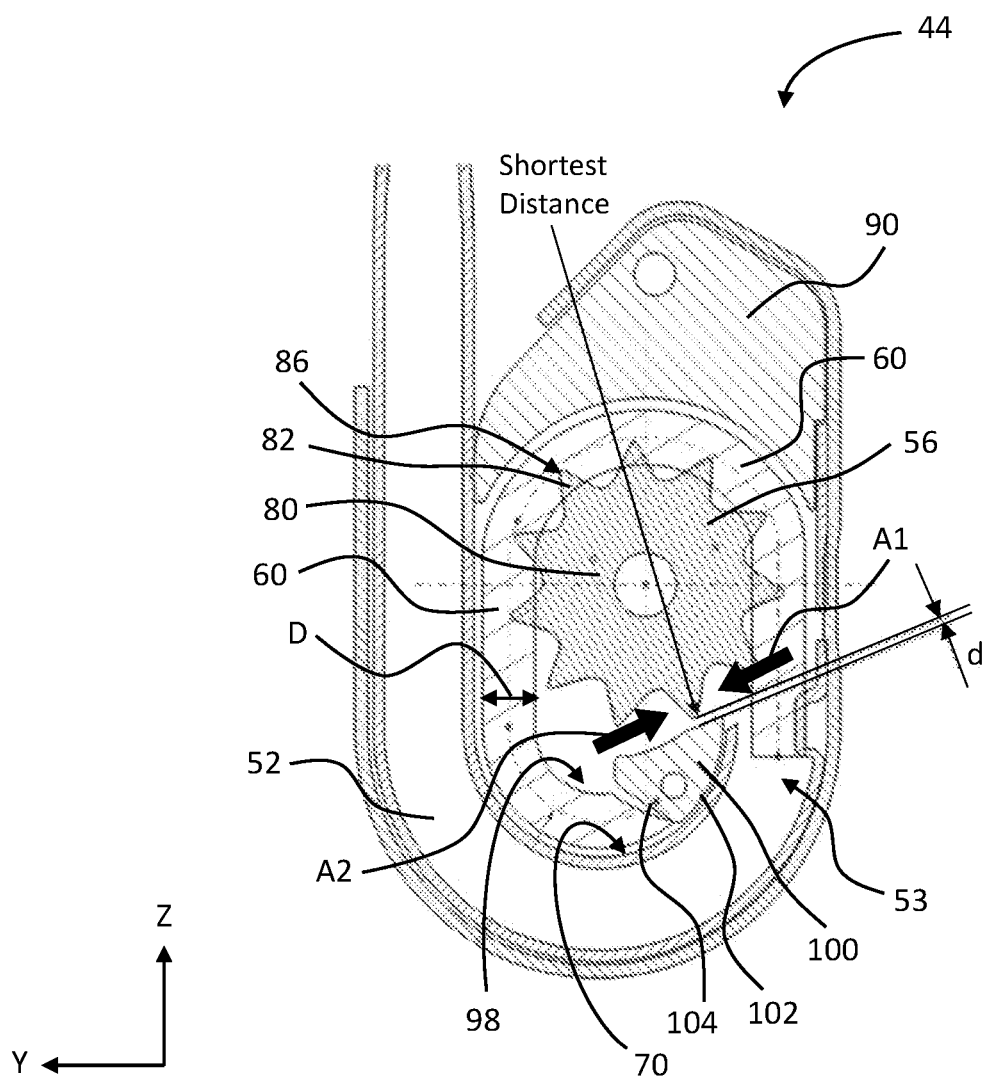
FIG. 7 is a cross-sectional view of the seatbelt retractor assembly including the pretensioner system in a third state, taken along line A-A of FIG. 3.

The vanes 82 each have a generally triangular shape when viewed from the front, with a base that tapers into the teeth point 86 as the vane 82 extends radially outward from the body portion 80 (See FIG. 7). The particular width and pitch of the vanes 82 can be selected as desired. The plurality of vanes 82 combine to define semi-spherical cavities 84 that are disposed between adjacent vanes 82.

According to an exemplary form of the present disclosure, each of the vanes 82 can have the same size and shape, and be uniformly distributed around the sprocket 56. In accordance with another form of the present disclosure, the vanes 82 can have different sizes and/or be spaced at different intervals. Adjusting the size and spacing of the vanes 82 can alter the amount of rotation and/or the rate of the rotation for the sprocket 56 when the pretensioner system 44 is activated. This variable size and/or spacing is possible due to the actuation by the rod 60 rather than by a series of similarly shaped balls. In a pretensioner that uses a plurality of ball-shaped driving element, the size and spacing is preferably uniform to account for the predetermined shape and size of the balls.

Figure 6:
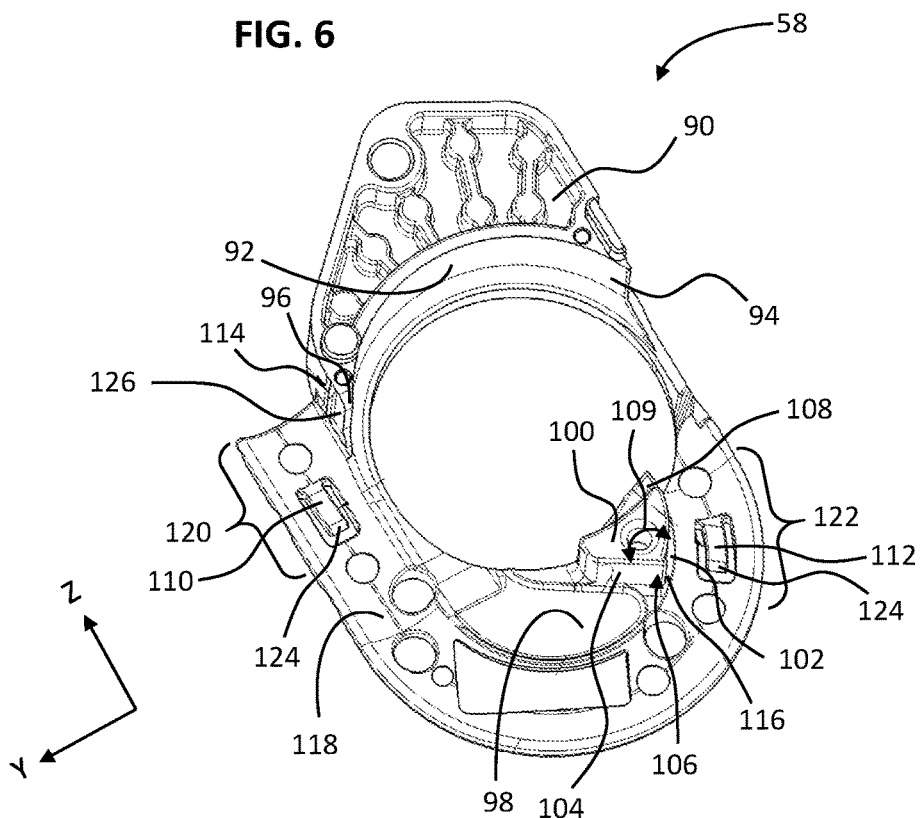
FIG. 6 is a perspective view of a guide plate including a couple of tabs and ribs according to the present disclosure.

Referring to FIGS. 4, 6 and 7, the pretensioner system 44 further includes a guide plate 58, which is placed inside the housing 54. The guide plate 58 includes a guide portion 90 disposed within the housing 54 similar to the sprocket 56. The guide portion 90 is disposed opposite an exit 53 of the tube 52, and the sprocket 56 is disposed between the guide portion 90 and the tube 52. As shown in FIG. 7, accordingly, the rod 60 exiting the tube 52 will contact the sprocket 56 prior to contacting the guide portion 90 on the guide plate 58.

In FIGS. 6 and 7, the guide portion 90 has a generally arcuate landing surface 92 that has a concave shape toward the exit 53 of the tube 52. In one approach, the arc of the surface 92 has a constant radius. Further, the center point of the radius of the arc is aligned with the rotational axis of the sprocket 56, such that the radial spacing between the surface 92 and the sprocket 56 is consistent along the surface 92. In another approach, the center point of the radius of the surface 92 could be offset from sprocket axis, such that the radial spacing between the surface 92 and the outer diameter of the sprocket 56 will vary at different points along the surface 92. The surface 92 includes a first end 94 and second end 96. The first end 94 is disposed opposite the exit 53 of the tube 52 such that the rod 60 would engage the first end 94 prior to the second end 96 after exiting the tube 52 and passing the sprocket 56.

In FIG. 6, the guide plate 58 further defines an overflow cavity 98 that is disposed opposite the guide portion 90. The overflow cavity 98 is also disposed adjacent the curvature of the tube 52, and the sprocket 56 is disposed between the guide portion 90 and the overflow cavity 98. The overflow cavity 98 is sized and configured to allow a portion of the rod 60 to be received therein during actuation of the pretensioner system 44 if necessary. For example, after rod 60 has exited the tube 52, it will contact the guide portion 90 and be directed in an arcuate path corresponding to the guide portion 90, such that the rod 60 is ultimately directed toward the overflow cavity 98. The rod 60 can extend into the overflow cavity 98, and can further be guided along the curvature of the tube 52 that is adjacent the overflow cavity 98. However, it will be appreciated that the rod 60 may not necessarily travel far enough during actuation to ultimately reach the overflow cavity 98.

As shown in FIGS. 6 and 7, the guide plate 58 further includes a rod guide 100 disposed at the exit 53 of the tube 52. The rod guide 100 is configured to prevent the rod 60 from going into the overflow cavity 98 before engaging with the vanes 82 of the sprocket 56, and force the rod 60 to engage with the vanes 82. In addition, the rod guide is 100 configured to prevent the rod 60 from squeezing between the tube 52 and the sprocket 56 when the rod 60 reaches to the overflow cavity 98 after pretensioning.

As shown in FIG. 6, the rod guide 100 includes a guiding surface 102, a stopping surface 104, a funnel-shaped portion 106 and a stepped portion 108. The guiding surface 102 faced to the tube 52 is curved along an outer surface 70 of the installed tube 52 near the exit 53 of the tube 52, and configured for guiding the rod 60 when the rod 60 is pushed out of the tube 52. The stopping surface 104 is faced to the overflow cavity area 98 and configured for stopping the rod 60 when the rod 60 is reached to the overflow cavity 98 after pretensioning. The funnel-shaped portion 106 is formed with an angle 109 between the guiding surface 102 and the stopping surface 104. Since the tip angle 72 of the distal end 64 of the rod 60 (see FIG. 4) corresponds to the angle 109 of the funnel-shaped portion 106, the funnel-shaped portion 106 of the rod guide 100 may stop the rod 60 effectively for preventing the rod 60 from squeezing between the tube 52 and the sprocket 56.

Due to the rod guide 100, the overflow cavity 98 disposed in the housing 54 is substantially separated from the exit 53 of the tube 52. Referring to FIG. 7, the rod guide 100 integrated with the guide plate 58 and disposed at the exit 53 of the tube 52 forms a narrow gap d between the teeth point 86 of the sprocket 56 and the rod guide 100. As shown in FIGS. 6 and 7, the stepped portion 108 of the rod guide 100 is formed on a side faced to the sprocket 56. The stepped portion 108 is configured for clearing the flanges 88 of the sprocket 56 so that the stepped portion 108 of the rod guide 100 is close to the teeth point 86 of the vane 82 without any interference with the flanges 88. Accordingly, when the pretensioner system 44 is assembled, the stepped portion 108 of the rod guide 100 may be placed between the both flanges 88 of the sprocket 56.

As shown in FIG. 7, the narrow gap d is smaller than a diameter D of the rod 60, and due to the narrow gap d, the rod guide 100 prevents the rod 60 from trapping before engaging with the sprocket 56. The narrow gap d is defined in the shortest distance between the teeth point 86 of the sprocket 56 and the stepped portion 108 of the rod guide 100. Accordingly, the rod guide 100 is configured to prevent the rod 60 from going to wrong way (such as an area of the overflow cavity 98) at the exit 53 of the tube 52 in case of high resistance or high temperature circumstance. In addition, as shown in FIG. 7, the rod guide 100 is configured to avoid squeezing of the rod 60 toward the narrow gap d from the exit 53 of the tube 52 before engaging with the sprocket (see arrow A1), and toward the narrow gap d from the overflow cavity 98 after reaching to the overflow cavity 98 after pretensioning (see arrow A2). Therefore, the rod 60 can be forced to engage with the cavities 84 of the sprocket 56 by blocking the rod 60 to go to a wrong direction.

Referring back to FIG. 6, the guide plate 58 further includes a couple of tabs 110 and 112, and a couple of ribs 114 and 116 as anti-rattling features. The features such as the tabs 110 and 112 and the ribs 114 and 116 are arranged for avoiding noise due to rattling of the tube 52 including the rod 60 in normal use of the retractor assembly 32. When the pretensioner tube 52 including the guide plate 58 is installed in the pretensioner system 44 with screws (not shown), the tabs 110 and 112 and the ribs 114 and 116 eliminate the rattling noise from the tube 52 of the system 44.

Figure 6A:
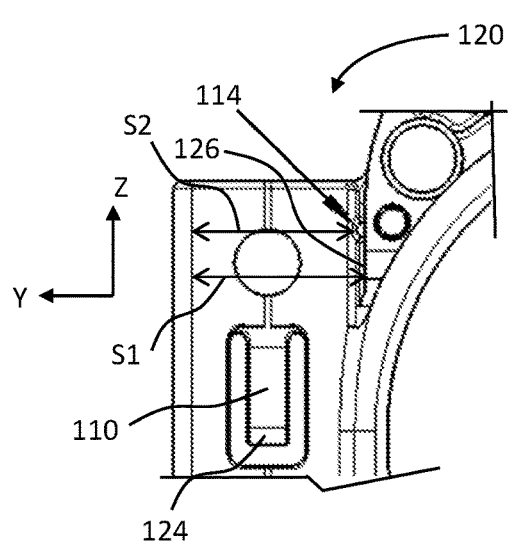
FIGS. 6A and 6B are detailed views of first and second areas of the guide plate in FIG. 6.
Figure 6B:
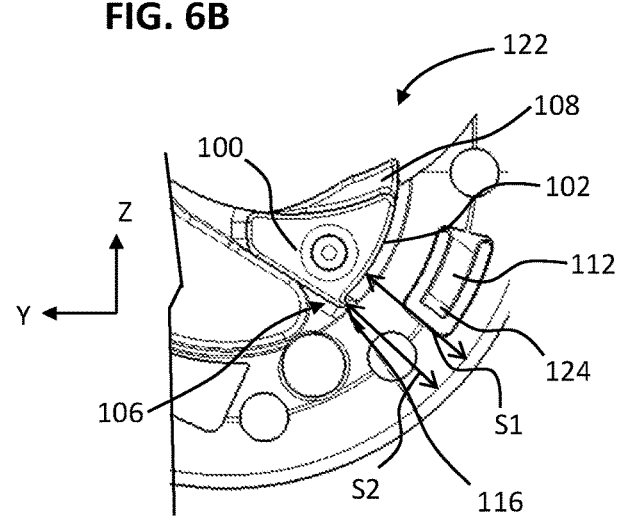
Figure 6C:
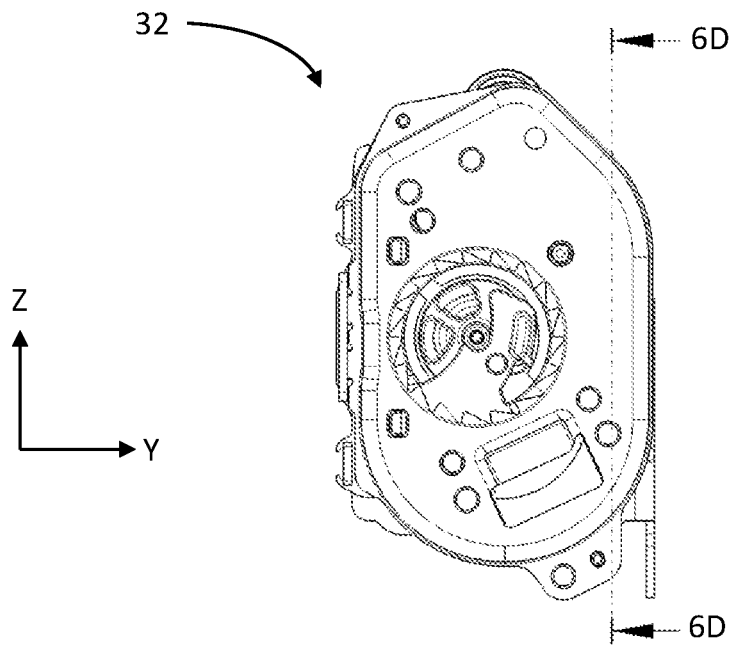
FIG. 6C is a side view of seatbelt retractor assembly including the pretensioner system in accordance with an exemplary form of the present disclosure.
Figure 6D:
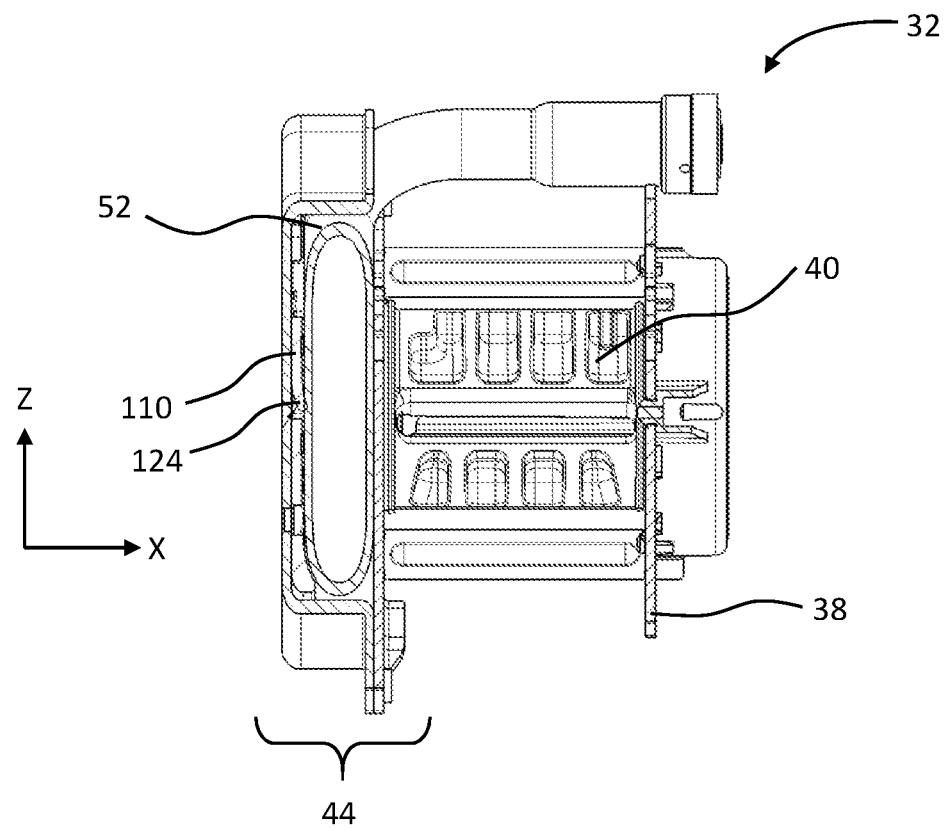
FIG. 6D is a cross-sectional view of a curved tab, taken along line 6D-6D of FIG. 6C.

As shown in FIGS. 6 through 6D, according to an exemplary form of the present disclosure, the first and second tabs 110 and 112 are formed on a sitting surface 118 of the guide plate 58 along a curved shape of the tube 52. The pretensioner tube 52 is placed on the sitting surface 118 of the guide plate 58 when the tube 52 is installed in the pretensioner system 44. The first tab 110 is positioned in a first area 120 close to the first tube end 51 of the pretensioner tube 52, and the second tab 112 is positioned in a second area 122 close to the exit 53 of the pretensioner tube 52. Both tabs 110 and 112 are formed on the sitting surface 118 along an axial direction of the tube 52. In addition, the tabs 110 and 112 are formed as a cantilever beam type, and a tab end 124 of the tabs 110 and 112 is curved to a side, on which the curved tabs 110 and 112 are resiliently contacted to the pretensioner tube 52 when the tube 52 is installed. (See FIG. 6D). Accordingly, when the tube 52 installed to the pretensioner system 44, the curved tabs 110 and 112 are configured to avoid the x-directional movement of the tube 52 because the tabs 110 and 112 are resiliently contacted to the tube 52 in the x-direction so that the tube 52 and the tabs 110 and 112 are press-fitted each other (See FIG. 6D). However, other configurations of the tabs such as the number of the tab or the location of the tab may be implemented according to other forms of the present disclosure.

As shown in FIGS. 6, 6A and 6B, the first and second ribs 114 and 116 are further formed on the guide plate 58 according to an exemplary form of the present disclosure. The first rib 114 is formed on a tube-contacting surface 126 of the guide portion 90, which is contacted to the pretensioner tube 52 in the first area 120, and the second rib 116 is formed on the guiding surface 102 of the rod guide 100 in the second area 122. As shown in FIGS. 6, 6A and 6B, the first rib 114 is protruded from the tube-contacting surface 126 of the guide portion 90, and the second rib 116 is protruded from the guiding surface 102 of the rod guide 100. However, other shapes of the ribs 114 and 116 are implemented according to other forms of the present disclosure. Due to the protruded ribs 114 and 116, a narrowed space S2 is defined in the housing 54 when the tube 52 is installed in the pretensioner system 44. The narrowed space S2 is smaller than a space 51 in which the tube 52 is originally placed without any interference. Accordingly, due to the narrowed space S2, the pretensioner tube 52 is interferencely fitted with the protruded ribs 114 and 116 when the tube 52 is installed in the pretensioner system 44. Furthermore, the protruded first rib 114 is configured to avoid the y-directional movement of the tube 52, and the second rib 116 is configured to avoid y- and z-directional movement of the tube 52 when the tube is installed. Therefore, the tabs 110 and 112 and the ribs 114 and 116 keep the tube 52 including the rod 60 from rattling in all three x-, y- and z-direction in the assembled pretensioner system 44. So, the tabs 110 and 112 and the ribs 114 and 116 may avoid potential rattling noise due to the assembly tolerance between the pretensioner tube 52 and the guide plate 58 in the housing 54. In FIG. 6, the tabs 110 and 112 and the ribs 114 and 116 both are illustrated, but in accordance with other forms of the present disclosure, either tabs 110 and 112 or ribs 114 and 116 may be formed for avoiding and eliminating the rattling noise of the tube 52 including the rod 60 when the tube 52 is installed in the pretensioner system 44.

As described above, the retractor assembly 32 further includes the gas generator 36 that provides expanding gas in response to a firing signal. The expanding gas causes an increase in pressure within the tube 52, which ultimately causes the rod 60 to be forced away from the gas generator 36 and through the tube 52.

Referring back to FIG. 4, the pretensioner tube 52 includes a piston or a seal 66. The seal 66 can have a cylindrical shape with a cylindrical outer surface as best shown in FIG. 4. However, other suitable shapes of the piston or seal 66 in accordance with other form of the present disclosure may be implemented. Activation of the gas generator 36 enables the seal 66 to resist gas leakage. Pressurized gas within a gas chamber 68 causes the seal 66 to expand, which helps prevent gas from escaping past the seal 66. Accordingly, the seal 66 of the present disclosure is operable to retain a high seal pressure as well as maintain residual gas pressure within the tube 52.

Figure 9:
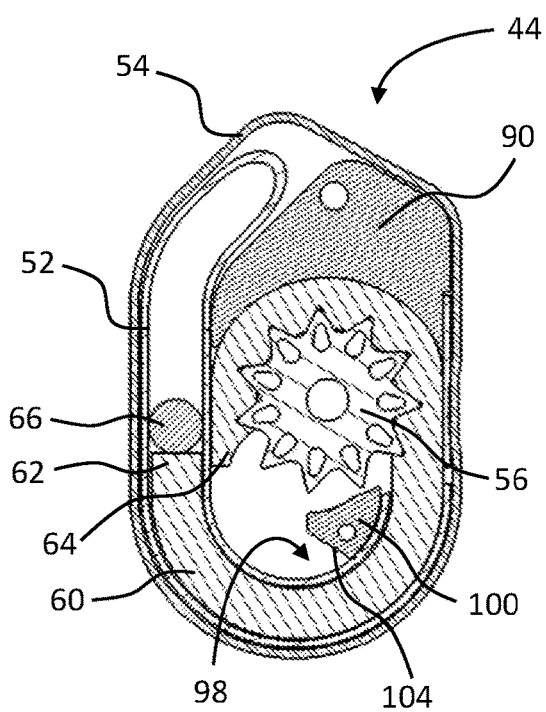
FIG. 9 is a cross-sectional view of the seatbelt retractor assembly including the pretensioner system with a seal in a second state, taken along line A-A of FIG. 3.
Figure 10:
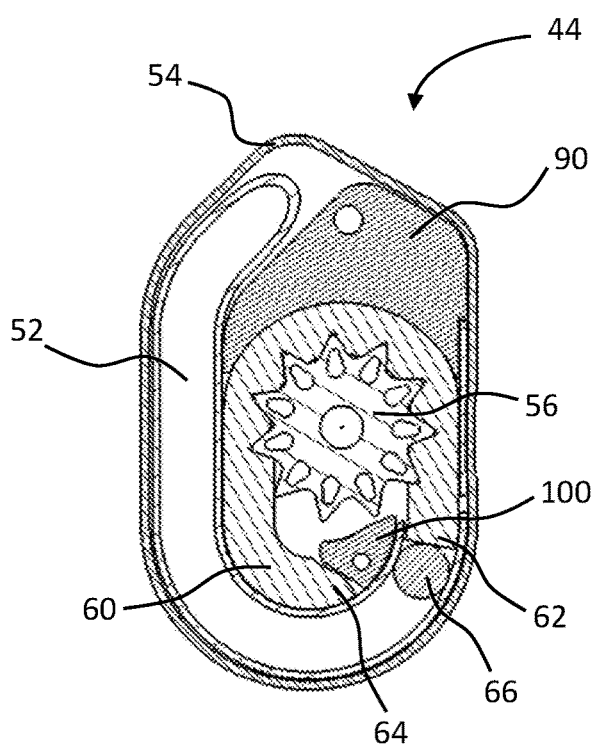
FIG. 10 is a cross-sectional view of the seatbelt retractor assembly including the pretensioner system with the seal in a third state, taken along line A-A of FIG. 3.

Referring to FIGS. 9 and 10, for example, the seal 66 is formed as a spherical shape. The seal 66 is slidably disposed within tube 52 and is operable to drive the rod 60 along an actuating path along the tube 52. As will be understood by those of skill in the art, the seal 66 may be press-fitted or otherwise fitted inside the tube 52. In addition, the seal 66 defines a generally elastic structure, and may be composed of various materials known in the art, such as any suitable plastic or polymer (e.g., polyester, rubber, thermoplastic, or other elastic or deformable material). Moreover, the seal 66 may be die cast, forged, or molded from metal, plastic or other suitable material. According to further aspect of the present disclosure, the seal 66 may be formed using a two-cavity or two shot (2K) injection molding process. The generally elastic structure allows the shape of the seal 66 to change slightly in response to pressure, thereby improving the sealing that it provides.

Figure 8:
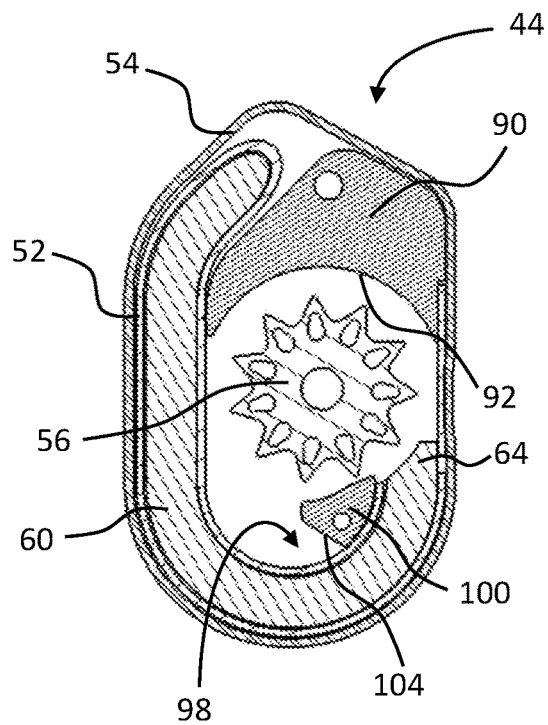
FIG. 8 is a cross-sectional view of the seatbelt retractor assembly including the pretensioner system in a first, non-actuated state, taken along line A-A of FIG. 3.

As shown in FIGS. 8 through 10, the general functionality of the pretensioner system 44 will now be described.

The pretensioner has a first, initial or nominal state, in which the rod 60 is positioned within the tube 52, as shown in FIG. 8. The seal 66 is positioned upstream of the rod 60. The gas generator 36 is attached to the first tube end 51 of the tube 52 so that the gas chamber 68 is defined between the gas generator 36 and the seal 66 (see FIG. 4).

In response to an event or signal that actuates pretensioning, the gas generator 36 will expel gas into the gas chamber 68. The increased pressure within the chamber 68 will force the seal 66 and rod 60 away from the gas generator 36 and along the path defined by the tube 52. The distal end 64 of the rod 60 will translate toward the sprocket 56, ultimately contacting one of the vanes 82 of the sprocket 56. The force from the rod 60 exerted against the vane 82 will cause the sprocket 56 to rotate about its rotational axis, thereby ultimately winding the webbing 14 around the spindle 40. At this point, the rod 60 is in a second, actuated position relative to its initial, nominal position as shown in FIG. 9.

The rod 60 will continue being driven, such that it contacts the guide portion 90 and is directed to an arcuate path corresponding to the surface 92 of the guide portion 90. The rod 60 will continue to rotate the sprocket 56 as it translates along the guide portion 90. The distal end 64 of the rod 60 will ultimately travel into the overflow cavity 98 98, disengage from the sprocket 56 and contact to the rod guide 100 as shown in FIG. 10. The sprocket 56 will continue to be driven by the engagement between the rod 60 and the sprocket 56. With the rod 60 partially disengaged with the sprocket 56, the rod 60 is in third position.

While in the third position in FIG. 10, the rod 60 between the sprocket 56 and the guide portion 90 is compressed and deformed plastically. The compression will also cause the rod 60 to be compressed against the guide portion 90, creating a press-fit configuration of the rod 60 between the sprocket 56 and the guide portion 90. According to an exemplary form of the present disclosure, the rod 60 and guide portion 90 are made from materials that will weld together by heat generated from the friction between the rod 60 and the guide portion 90 at the end of the pretensioning stroke. Accordingly, the rod 60 is prevented from moving in the reverse direction in embodiments that include the rod 60 and the guide portion 90 welding together in this position. This is referred to as the locked position.

During actuation, the seal 66 will also travel along the tube 52, and the seal's travel assists in driving the rod 60 through the tube 52. The seal 66 likewise has first, second and third positions as shown in FIGS. 8 through 10. As shown in FIGS. 9 and 10, in the second and third position of the rod 60, the seal 66 will have a circumferentially expanded state in the positions.

While the above description constitutes the preferred embodiments of the present invention, it will be appreciated that the invention is susceptible to modification, variation and change without departing from the proper scope and fair meaning of the accompanying claims.

What is claimed is:

1. A seatbelt pretensioning retractor assembly including a spindle and a frame for use in a vehicle, the seatbelt pretensioning retractor assembly comprising:
    a housing adapted for being mounted to the frame and having an interior cavity;
    a pretensioner tube having an arcuate and curved shape having a first tube end in fluid communication with a gas generator and an exit in fluid communication with the interior cavity of the housing;
    a sprocket rotatably mounted to the housing and fixedly coupled to the spindle adapted for taking up a seatbelt webbing during a pretensioning;
    a rod disposed within the pretensioning tube and having a proximal end disposed towards the gas generator and a distal end disposed away from the gas generator; and
    a guide plate placed in the housing, the guide plate having at least one tab for resiliently contacting the pretensioner tube when the pretensioner tube is installed in the housing mounted the frame.

2. The seatbelt pretensioning retractor assembly of claim 1, wherein the at least one tab is formed on a sitting surface of the guide plate and configured to avoid rattling of the pretensioner tube in normal use of the retractor assembly.

3. The seatbelt pretensioning retractor assembly of claim 1, wherein a tab end of the at least one tab is curved so that the curved tab end resiliently contacts the pretensioner tube.

4. The seatbelt pretensioning retractor assembly of claim 1, wherein a first tab of the at least one tab is positioned in a first area close to the first tube end of the pretensioner tube, and a second tab of the at least one tab is positioned in a second area close to the exit of the pretensioner tube.

5. The seatbelt pretensioning retractor assembly of claim 1, wherein the at least one tab is formed as a cantilever beam type.

6. The seatbelt pretensioning retractor assembly of claim 1, wherein the at least one tab is press-fitted to the pretensioner tube and avoid x-directional movement of the tube when the pretensioner tube is installed in the housing.

7. The seatbelt pretensioning retractor assembly of claim 1, wherein the guide plate further includes at least one rib for avoiding rattling of the pretensioner tube when the pretensioner tube is installed in the housing.

8. The seatbelt pretensioning retractor assembly of claim 7, wherein a first rib is protruded from a tube-contacting surface of a guide portion in a first area, and a second rib is protruded from a guiding surface of a rod guide in a second area.

9. The seatbelt pretensioning retractor assembly of claim 8, wherein a narrowed space is defined in each of the first area and the second area due to the protruded ribs for an interference-fit between the protruded ribs and the pretensioner tube.

10. The seatbelt pretensioning retractor assembly of claim 8, wherein the first rib is configured to avoid y-directional movement of the pretensioner tube and the second rib is configured to avoid y- and z-directional movement of the pretensioner tube.

11. The seatbelt pretensioning retractor assembly of claim 1, wherein the rod exits the tube, along a perimeter of the sprocket, and toward an arcuate landing surface of a guide portion in response to an actuation by the gas generator to rotate the sprocket and spindle to take up seatbelt webbing.

12. The seatbelt pretensioning retractor assembly of claim 1, wherein the sprocket includes a plurality of vanes, that plastically deform the rod in response to the rod engaging the sprocket.

13. The seatbelt pretensioning retractor assembly of claim 1, wherein the sprocket rotates in response to the rod contacting the sprocket.

14. The seatbelt pretensioning retractor assembly of claim 1, further comprising a seal member disposed within the tube between the gas generator and the rod.

15. The seatbelt pretensioning retractor assembly of claim 1, wherein the assembly has a first state prior to actuation of the gas generator, where the distal end of the rod is disposed proximally from the exit of the tube, a second state, where the distal end of the rod engages the sprocket, and a third state, where the distal end of the rod is disengaged from the sprocket.

* * * * *